United States Patent
Massaru Amemiya

(10) Patent No.: US 10,200,673 B2
(45) Date of Patent: Feb. 5, 2019

(54) OPTICAL SYSTEM FOR CAPTURING AND REPRODUCING MOVING REAL IMAGES

(71) Applicant: Roberto Massaru Amemiya, São Paulo (BR)

(72) Inventor: Roberto Massaru Amemiya, São Paulo (BR)

( * ) Notice: Subject to any disclaimer, the term of this patent is extended or adjusted under 35 U.S.C. 154(b) by 353 days.

(21) Appl. No.: 14/894,929

(22) PCT Filed: May 20, 2014

(86) PCT No.: PCT/BR2014/000165
§ 371 (c)(1),
(2) Date: Nov. 30, 2015

(87) PCT Pub. No.: WO2014/190404
PCT Pub. Date: Dec. 4, 2014

(65) Prior Publication Data
US 2016/0119609 A1      Apr. 28, 2016

(30) Foreign Application Priority Data
May 31, 2013   (BR) .............................. 102013013559

(51) Int. Cl.
*H04N 13/236*   (2018.01)
*H04N 13/211*   (2018.01)
(Continued)

(52) U.S. Cl.
CPC ....... *H04N 13/236* (2018.05); *G02B 27/2214* (2013.01); *H04N 13/211* (2018.05);
(Continued)

(58) Field of Classification Search
None
See application file for complete search history.

(56) References Cited

U.S. PATENT DOCUMENTS 3,944,322 A * 3/1976 Benton .................... G03H 1/22
                                                                  359/31
4,533,210 A      8/1985 Jeskey
(Continued)

OTHER PUBLICATIONS

Fujii et al., "Ray-Space Transmission System with Real-Time Acquisition and Display", IEEE, 2007, pp. 78-79.*
(Continued)

*Primary Examiner* — Hung Q Dang
(74) *Attorney, Agent, or Firm* — Lewis Roca Rothgerber Christie LLP

(57) ABSTRACT

Invention Patent: Rays tridimensional capture camera and television television to produce a real image formed in the front and in the back surface of said television; parallel rays filter devices; leveled liquid crystals or optical cells movement or parallel rays filter with a set of moving lenses including multifocal flexible lenses; methods for obtaining these said devices. The present invention refers to a tridimensional capture of rays by a camera and rays emission with a real image formation by a television. Rays capture and emission are carried out by a parallel rays filter. Parallel rays filter devices are: leveled liquid crystals by opening of windows with the same colors in each surface. Movements of an optical cells set with vertexes in set base; or a parallel rays filter with a set of moveable lenses including multifocal flexible lenses supported on an inclined base. Filtered rays fall upon a coupled charge device (CCD). Image reproduction is reversely made into a monitor. Rays emission from this surface through a parallel rays filter raise a real image. Said real image is formed in a space in the front and in the back of said television surface.

7 Claims, 2 Drawing Sheets

(51) Int. Cl.
*H04N 13/32* (2018.01)
*H04N 13/282* (2018.01)
*H04N 13/257* (2018.01)
*H04N 13/354* (2018.01)
*H04N 13/264* (2018.01)
*G02B 27/22* (2018.01)

(52) U.S. Cl.
CPC ......... *H04N 13/257* (2018.05); *H04N 13/264* (2018.05); *H04N 13/282* (2018.05); *H04N 13/32* (2018.05); *H04N 13/354* (2018.05)

(56) References Cited

U.S. PATENT DOCUMENTS

| | | | |
|---|---|---|---|
| 4,553,818 A | 11/1985 | Cohen | |
| 4,621,898 A | 11/1986 | Cohen | |
| 5,991,073 A | 11/1999 | Woodgate et al. | |
| 6,646,623 B1 * | 11/2003 | Chakrabarti | G09G 1/06 345/5 |
| 7,738,151 B2 * | 6/2010 | Garner | G03H 1/02 359/32 |
| 7,750,981 B2 | 7/2010 | Shestak et al. | |
| 8,339,444 B2 | 12/2012 | Schultz et al. | |
| 2007/0019784 A1 * | 1/2007 | Ting | A61B 6/025 378/21 |
| 2010/0039698 A1 | 2/2010 | Robinson et al. | |
| 2012/0140132 A1 | 6/2012 | Wu | |
| 2012/0163552 A1 | 6/2012 | Ding | |
| 2013/0093752 A1 | 4/2013 | Yuan | |
| 2014/0125892 A1 | 5/2014 | Chen et al. | |

OTHER PUBLICATIONS

Naemura, et al., "Ray-based approach to Integrated 3D Visual Communication", SPIE, vol. CR76, Nov. 2000, pp. 282-305.*
Xu et al., "Ray-Space Based Camera Spacing Correction via Convex Optimization", IEEE, 2013, pp. 1845-1848.*
Wang et al., "Parallel Interactive Ray-Space Rendering Approach and Implementation", IEEE, 2009, 4 pages.*
International Search Report for corresponding International Application No. PCT/BR2014/000165, dated Aug. 5, 2014, 6pp.
Lanman, Douglas et al.; "Content-Adaptive Parallax Barriers: Optimizing Dual-Layer 3D Displays using Low-Rank Light Field Factorization"; acm Transactions on Graphics; Dec. 2010; vol. 29; No. 6; Proceedings of ACM SIGGRAPH Asia 2010, Seoul, South Korea; 13pp.

* cited by examiner

Figura 1
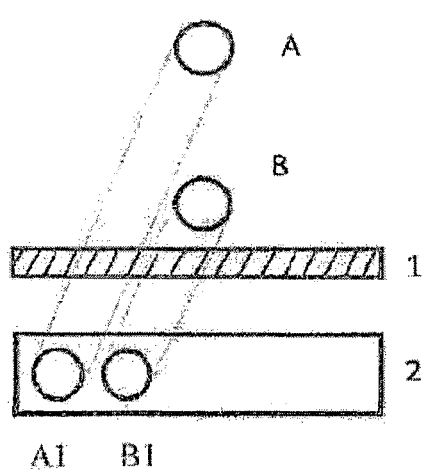
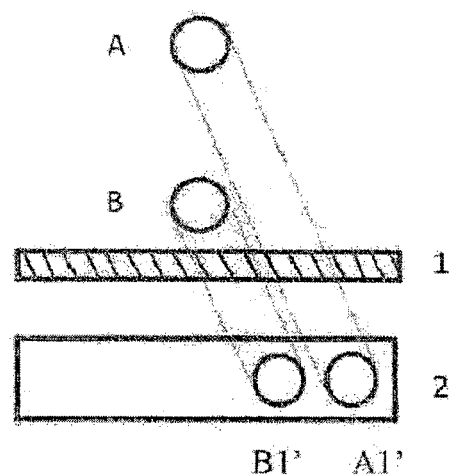

Figura 2
T3
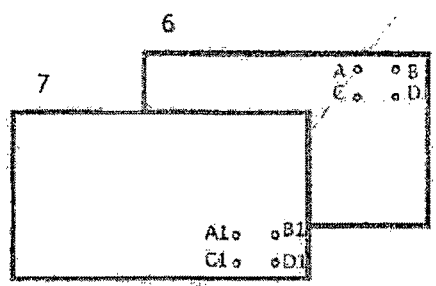
T4
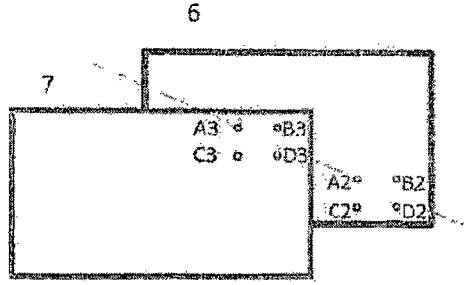
Figura 3
T5
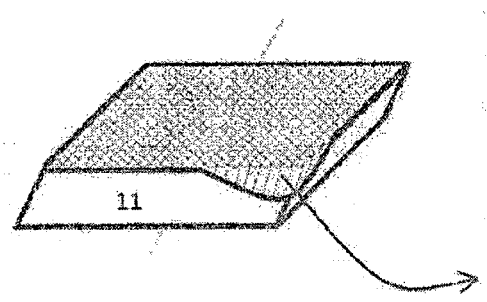
T6
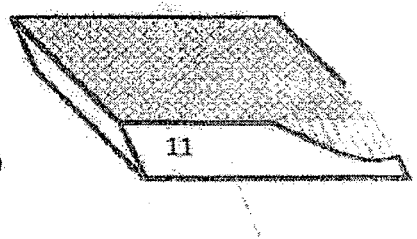
Figura 4
T7
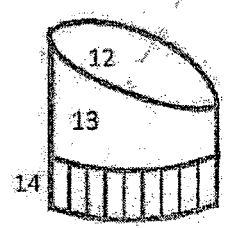
T8
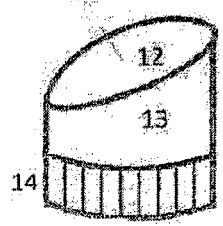

OPTICAL SYSTEM FOR CAPTURING AND REPRODUCING MOVING REAL IMAGES

CROSS-REFERENCE TO RELATED APPLICATIONS

This application is a national phase application under 35 U.S.C. § 371 of International Application No. PCT/BR2014/000165, filed on May 20, 2014, which claims the benefit of Brazilian Patent Application No. 102013013559-3, filed on May 31, 2013, the disclosures of which are incorporated herein by reference in their entirety.

This instant invention relates to production of real images by use of television and camcorder (also referred to as camera) which tri-dimensionally capture rays. The real object present in a field of vision issues rays that are tri-dimensionally captured in all issued angles within the capturing vision field of the camera. There are several means by which the camera selects each light beam issued by an object: liquid crystal or optical cells or parallel rays filter united with several lenses, including multifocal flexible lenses. The way to select each light beam is carried out by two liquid crystals with opening windows, one of said windows in a liquid crystal and the other window in another crystal. Multiple color filters may be simultaneously used in the windows. The way to select each light beam is carried out by optical cells moving towards several directions with a vertex in the base. The way to select each light beam is carried out by parallel rays filter having parallel optical cells united to several types of lenses including multifocal flexible lenses. Lenses with translation movement over a parallel rays filter or by means of flexible lenses may use several mechanisms to change surface curvature. Flexible inclined lenses having rotation movements capture an issued radiation within the range of vision field. A television with real image has a monitor that reverses the image thus displacing said image from its center so as to follow the angles formed by filtered rays. Accurate and synchronized reproduction with images from the parallel rays filter thereby forms a real image.

Currently moving images are produced by television or cinema. Production of images by means of quick sequences imparts a perception of continuous movement to the images. Tridimensional (3D) television or cinema is a composition of two images that are perceived by each eye giving an impression of depth. In its turn holography is an impression of multiple images within a flat surface. Yet, in its turn a mirror reflects real images. In the current prior art related to light parallel beams a device known as parallel beam telescope or telephoto exists. This is a device formed by numerous optical cells that capture light rays parallel to one another only. Such optical cells are formed by thin opaque elongate tubes. In the current prior art related to lenses said lenses are fixed in their bases almost having no movements.

The existing problems in the images of the current prior art are that the television or cinema reproduces a bi-dimensional image (2D) which is not a real image. 3D television or cinema produces two images that are a little bit different and one for each eye with or without use of light filter glasses thus producing a tridimensional sensation. However, as it is not a real image, observation into different angles is not possible. Holography is an impression of several images in a surface whereof observation of several object angles is possible. It is not a real image. It is not provided with movements. A mirror reflects an image of the object, thus producing an image which is real, dynamic and able of being watched into several angles of the object but does not allow transmission of the image or having the image recorded by any kind of apparatus.

On its turn the problem with parallel rays filter is its resolution. Optical cell is formed by elongate thin opaque tubes. Resolution is the ability of individually forming two object points. Two points of the object which are sufficiently close to each other may be viewed in an image as a single point, that is, a region into which one cannot clearly identify what corresponds to each of two distinct points of an object. That is, when this occurs the optical system lost ability to distinguish between said two points and its resolution is then prejudiced. The shortest distance between two points able of being distinguished expresses the optical system resolution power and the shortest such distance is the greater the resolution power is. Angular distance is an angle whose vertex is located in the optical center of the system having as arch a linear distance between two points The problem with lenses is that they have a non-variable focal axis. Rigid lenses have a fixed focus point which becomes variable with flexible lenses.

The solution to form a real image is the capture of rays, not capture of an image. Manipulations and emissions of rays maintain the same characteristics. A ray may be recorded and transmitted and may be manipulated to form up an image.

The solution for rays filter resolution is to create liquid crystals leveled with small windows. Multiple colored windows, one color in each leveled liquid crystal, to allow multiple angles of rays coming from the surface of an object to go through. The movements of windows allow the capture in different angles of rays issued from the surface of said object. Optical cell resolution can be improved by adding one or more divergent or convergent lenses in the light course within an optical cell or by means of light concentric narrowing. By doing so the angular distance becomes shorter. The rays filter has better quality parallel rays with optical cells in such a way that rays filter length can be shortened.

The solution for variation of focal axis so as to encompass the whole vision field is found in the lens translation movement in the horizontal axis towards different directions or in a flexible lens movement with focal variation and not perpendicular in relation to a turning base.

The real image, the rays filter and multifocal lenses may be manufactured in large scale by electrical electronic manufacturers for users that handle images.

Real image formation comprises capture of parallel rays originated from several angles. Several angles parallel rays may be obtained by rays filter: two liquid crystals leveled with windows that allow multiple angles of beams coming from the surface of an object to pass through windows or through a parallel rays filter, said parallel rays moving with the vertex in their base or through a parallel rays filter fixed with a set of moving lenses that capture rays several angles. Parallel filtered rays should fall on a CCD's surface. Generated electrical impulses may be stored or transmitted to a receptor apparatus. The image supplied by a receptor should have a deviation in its center in accordance with the parallel rays filter angles when said filter is used to capture said rays. Rays originated from said receptor pass through said rays filter thus forming a real image.

The novelty lies in obtaining a real image which is a tridimensional image (3D), storage and transmission from one apparatus to another one and projecting a real image in the front and in the back of a television monitor with movements without using glasses and watching it in several angles. The novelty of having two liquid crystal leveled surfaces for filtering parallel rays lies in the lack of movements to widely encompass the vision field. The novelty in the optical cell is that it has a greater resolution and it is not required to be too lengthy but rather requires shorter movements to widely encompass the field of vision. In case flexible lenses are used to widely encompass the field of vision the novelty is to be provided with rotation in its base thus not requiring the use of a telescope.

BRIEF DESCRIPTION OF THE DRAWINGS

FIG. 1 schematically illustrates the camera and the real image television and respective process to make both. The real image forming camera (with its end directed to an object) is located in the upper portion of said figure. The real image forming television (with its end directed to a viewer) is located in the lower portion of said figure. In FIG. 1 a left side drawing represents a moment T1 and a right side drawing represents a moment T2.

Number 1 represents a parallel rays filter

Number 2 represents a CCD

Number 3 represents a method to form an image or computer recording with data from the moments the image was capture by said CCD.

Number 4 represents a monitor

Number 5 represents a parallel rays filter

Letter A is a real object positioned in front of another real object with letter B.

Letters A1 and B1 represent incidence or rays captured by rays (1) filter in the real image camera over the CCD (2) surface, such captured rays originated from real objects A and B in a moment T1. Letters A1' and B1' are a moment T2.

Letter A2 and B2 represent a reversely formed image in a moment T1 in an image receptor (4) in the real image television.

Letter A2' and B2' represent a reversely formed image in a moment T2 in an image receptor (4) in the real image television.

Letter A3 and B3 represent a real image formed in a moment T1 in an image receptor (4) in the real image television.

Letters A3' and B3' represent a real image formed in a moment T2 in an image receptor (4) in the real image television.

The real objects A and B in a moment T1 issue rays that pass through a parallel rays filter (1) with left-sided inclination. The image is formed in a CCD (2) surface whereof an object is farthest located and a little bit more at left side. An image (3) processing is carried out by a computer which directs a reversed image displaced at a right side in the real image television monitor (4). Said image now again passes through a parallel light filter (5) with the same left-sided inclination. Rays that are issued have the same characteristics of those captured rays. Yet, in another moment T2 parallel rays filter inclination is directed to right side and the whole process is now repeated. This process is repeated into several angles from right/left side and front/back side within fractions of seconds thus causing the same impression as that of a sequential images television when the field of vision is fully viewed and same impression of a moving real image. Depending upon the site the eyes of a watching person are located a selection of angles more often used may be provided in the phase of image (3) processing.

FIG. 2 schematically illustrates a parallel ray filter using two liquid crystals in the front (6) and in the back (7).

Letter A, for instance, a blue filter window in a liquid crystal (6) surface and letter A1 a blue filter window in a liquid crystal (7) surface. Letters B and B1 green filter windows; C and C1 and D and D1 having different color filters. Dotted line represents a light beam that passes through from window A towards window A1 blue filter. Parallel beams having different colors are selected to pass through liquid crystals several windows. Windows are open in different positions in the liquid crystal surfaces in different moments T3 and T4. Angles of beams that are obtained are different. At moment T3 liquid crystal (6) windows A2, B2, C2 and D2 and liquid crystal (7) windows A3, B3, C3 and D3 have different angles.

FIG. 3 schematically illustrates a parallel rays filter using light parallel beams cells with movements in the filter base.

Number 8 represents an optical cell.

Number 9 represents a lens which may be a convergent or divergent one. Optical cell walls are opaque. Number 10 represents an optical cell narrowing with a center orifice. Number 11 represents a flexible framework that joins together all optical cells.

Dotted lines represent light beams passing through an optical cell in distinct moments T5 and T6 with different angles that are determined by an optical cell upper portion movement having as vertex said optical cell base.

FIG. 4 schematically represents the parallel rays filter and multifocal flexible lens with an inclination relative to its base.

Number 12 represents a multifocal flexible lens supported by a tube having inclination relative to said lens base (13). This said tube (13) is provided with rotation movements.

Number 14 represents a parallel ray filter having a immobile wrapper, said parallel rays standing perpendicularly to the filter base.

Light rays having distinct angles are captured in distinct moments T7 and T8, said distinct angles represented by dotted lines. As said lens is a flexible lens capture of rays with different angles occurs even with lens face inclined to the same side because a flexible lens has variable focus points.

The expressions "camcorder" and "camera" are used in this patent application specification as having equivalent meanings.

The invention claimed is:

1. An optical system for capturing and reproducing moving real images comprising:
   a camcorder including:
   a first filter configured at a first inclination angle for generating first parallel rays, from fields of vision of a first object located at a first location and a second object located at a second location in front of the first object, the first filter inclined to a first side of the first and second locations by the first inclination angle, with respect to a central axis of the optical system;
   a CCD for capturing the first parallel rays from the first filter and forming a first image of the first object displaced at a third location to the first side of the first locations and a second image of the second object displaced at a fourth location to the first side of the second location, with respect to the central axis of the optical system;
   a processor for processing the first and the second images captured by the CCD and reversing an order of the third location of the first image and the fourth location of the second image;
   a second filter configured at the first inclination angle for generating second parallel rays from the reversed order of the third location of the first image and the fourth location of the second image; and a display for displaying the second parallel rays, wherein the second parallel rays form an image of the first object at the first location and an image of the second object at the second location with respect to the central axis of the optical system, on the display, and wherein the processor reconfigures the first and second filters to incline to a second side of the first and second locations opposite to the first side by a second inclination angle, with respect to a central axis of the optical system to capture images of the first and second objects from a different angle, and display said images on the display, and wherein the processor repeatedly reconfigures the first and second filters to incline to different sides of the first and second locations to cause as impression of moving reals images of the first and second objects on the display.

2. The optical system of claim 1, wherein, the processor repeatedly reconfigures the first and second filters to incline alternatively to different sides of the first and second locations to capture images of the first and second objects at all angles of irradiation of the first and second objects.

3. The optical system of claim 1, wherein, the first filter and the first and second images captured by the CCD are synchronized at a given time with the second filter and the processor and wherein the real images are formed in front of and behind the second filter.

4. The optical system of claim 1, wherein, the processor further electronically reverses the order of the third location of the first image and the fourth location of the second image shifted from right to left, from top to bottom and in different diagonals to reproduce the first and the second images captured by the CCD, in the same direction as a surface of the first filter.

5. The optical system of claim 1, wherein the first filter includes a pair of LCDs paired in parallel one in front of the other and each including a window on a surface respectively and one or more color filters, wherein the windows on the LCDs surface are pixels that allow the parallel rays to pass through the LCDs and surrounded by pixels that do not allow the parallel rays to pass through the LCDs, and wherein an opening of a window with the same color filter on the surface of each liquid crystal provides a selection of a ray of the filter color, and wherein the processor generates a signal to open and close the windows causing a movement of the windows on each LCD surface, such that the parallel rays filtered by the windows cover the field of view of the camcorder.

6. The optical system of claim 1, wherein the first filter includes a plurality of optical cells with divergent or convergent lenses or constrictions in a central hole of each of the optical cells to increase a resolution of the optical system.

7. The optical system of claim 6, wherein each optical cell includes a tube perpendicular to its base, wherein the first parallel rays pass through a plurality of multifocal flexible lenses that are supported by inclined surfaces of tubes that rotate.

* * * * *